United States Patent [19]

Zeiner et al.

[11] Patent Number: 5,302,284

[45] Date of Patent: Apr. 12, 1994

[54] FUEL FILTER WITH SPRING-LOADED RETENTION SYSTEM

[75] Inventors: Robert W. Zeiner, Torrington; M. Craig Maxwell, Colchester, both of Conn.

[73] Assignee: Stanadyne Automotive Corp., Windsor, Conn.

[21] Appl. No.: 997,289

[22] Filed: Dec. 23, 1992

[51] Int. Cl.⁵ .............................................. B01D 27/08
[52] U.S. Cl. ..................................... 210/232; 210/438; 210/440; 210/444
[58] Field of Search ............... 210/232, 435, 438, 440, 210/443, 444, 437

[56] References Cited

U.S. PATENT DOCUMENTS 5,203,994  4/1993  Janik ..................................... 210/438

Primary Examiner—Matthew O. Savage
Attorney, Agent, or Firm—Chilton, Alix & Van Kirk

[57] ABSTRACT

A fuel filter assembly employs a spring-loaded collar which retains the disposable cartridge to the base. The collar carries a wave spring and comprises followers which ascend a spiral ramp of the base for securing the disposable cartridge to the base in a positive locked position. The filter assembly also incorporates an efficient bleed orifice and a pair of axial spaced seal rings for implementing a fluid seal with the received disposable cartridge.

20 Claims, 4 Drawing Sheets

FUEL FILTER WITH SPRING-LOADED RETENTION SYSTEM

BACKGROUND OF THE INVENTION

This invention relates generally to devices for filtering and separating liquids. More particularly, the present invention relates to fuel filters for removing foreign particles and separating water from fuel in the fuel supply systems of an internal combustion engine.

Fuel filters commonly employ a disposable filter cartridge which is replaced at pre-established intervals of filter usage. The disposable cartridge is conventionally secured to the filter assembly base by a retaining or locking mechanism, which is releasable to allow for the removal of the cartridge for replacement purposes. There are numerous conventional fuel filter cartridge base retention systems. Many of such retention systems become exceedingly troublesome to use or even fail over time due to the harsh environment of the fuel filter assembly.

In U.S. Pat. No. 5,017,285, which is assigned to the assignee of the present invention, one disclosed inverted fuel filter assembly employs a base which fixedly mounts to the vehicle. A disposable filter cartridge is suspended directly below the filter base. The cartridge is retained to the base by a threaded collar. The collar includes a ramp which retentively engages against a circumferential roll seam structure at the periphery of the cartridge housing. The collar threads to the base, and the cartridge is replaced by loosening the threaded collar and dismounting the filter cartridge.

In U.S. patent application Ser. No. 7/466,693 filed on Aug. 16, 1991, which application is assigned to the assignee of the present invention, a disclosed fuel filter assembly employs a retainer collar which locks the disposable cartridge to the base. The base has an inverted cup-like receiving skirt. A pair of spiral ramps extend at the exterior of the skirt. Stops are angularly spaced from an upper end of the ramp to define detentive slots. The disposable cartridge which houses one or more filter elements is partially receivable by the base skirt. The cartridge has a peripheral engagement flange. The retainer collar has a shoulder which is engageable against the flange and an integral inner spiral follower which terminates in a catch. A spring in the form of a spring washer which has two alternating sets of spring leaves is disposed between the base and the cartridge. One set of the leaves is engageable against the cartridge and the other is engageable against the base. The spring washer is retained to the base by means of a retainer ring. Each follower rides the base ramp until the catch engages the stop and is positively captured in the slot under the bias of the spring.

SUMMARY OF THE INVENTION

Briefly stated, the invention in a preferred form is a fuel filter assembly which includes a base, a disposable cartridge mountable to the base and a retainer collar for securing the cartridge to the base. The collar carries a wave spring which is retained between spaced shoulders of the collar. The base forms a receptacle for receiving the top of the cartridge. A ramp and a detent adjacent to the end of the ramp project from the base. The retainer collar also includes a follower which has a catch. The follower is engageable with the ramp so that as the collar is angularly rotated, the follower rides the ramp and the catch engages in the detent under the bias of the spring to lock the cartridge to the base.

The wave spring is preferably a circular element which comprises four angularly spaced wave segments which are substantially identical. Planar washer segments integrally extend from ends of the wave spring with the wave segments being disposed between the washer segments. One of the washer segments engages the peripheral shoulder of the cartridge. The wave spring and each of the washer segments preferably substantially subtend approximately 360°.

The fuel filter cartridge comprises a housing having a first end and an axially spaced second end which defines an axial opening. A filter element is housed in the housing. A retaining shoulder extends generally radially outward from the housing to provide a structure for retaining the cartridge. A conduit extends axially from the opening to the housing interior. The conduit comprises a generally cylindrical portion and terminates in an end portion disposed between the first and second ends of the housing. A sealing element is mounted at the end portion for diametrally fluidically sealing a received conduit. The end portion is a nipple-like structure and the sealing element is preferably a grommet. An annular recess is defined inwardly adjacent to the retaining shoulder. A wall at the second end of the housing has a sinusoidal section. The housing preferably comprises a pair of housing sections which are joined along a circumferential roll seam to also form the retaining shoulder. At least one key radially protrudes from one of the generally cylindrical sections.

An object of the invention is to provide a new and improved retention system for releasably retaining a disposable cartridge to the base of a fuel filter.

Another object of the invention is to provide a new and improved fuel filter retention system which operates in an efficient manner and implements a substantially uniform loading between a disposable filter cartridge and a base.

A further object of the invention is to provide a new and improved fuel filter assembly wherein the disposable cartridge may be efficiently sealed and locked to the base and dismounted from the base for replacement in a reliable and efficient manner.

Other objects and advantages of the invention will become apparent from the drawings and the specification.

DETAILED DESCRIPTION OF THE PREFERRED EMBODIMENT

Figure 1:
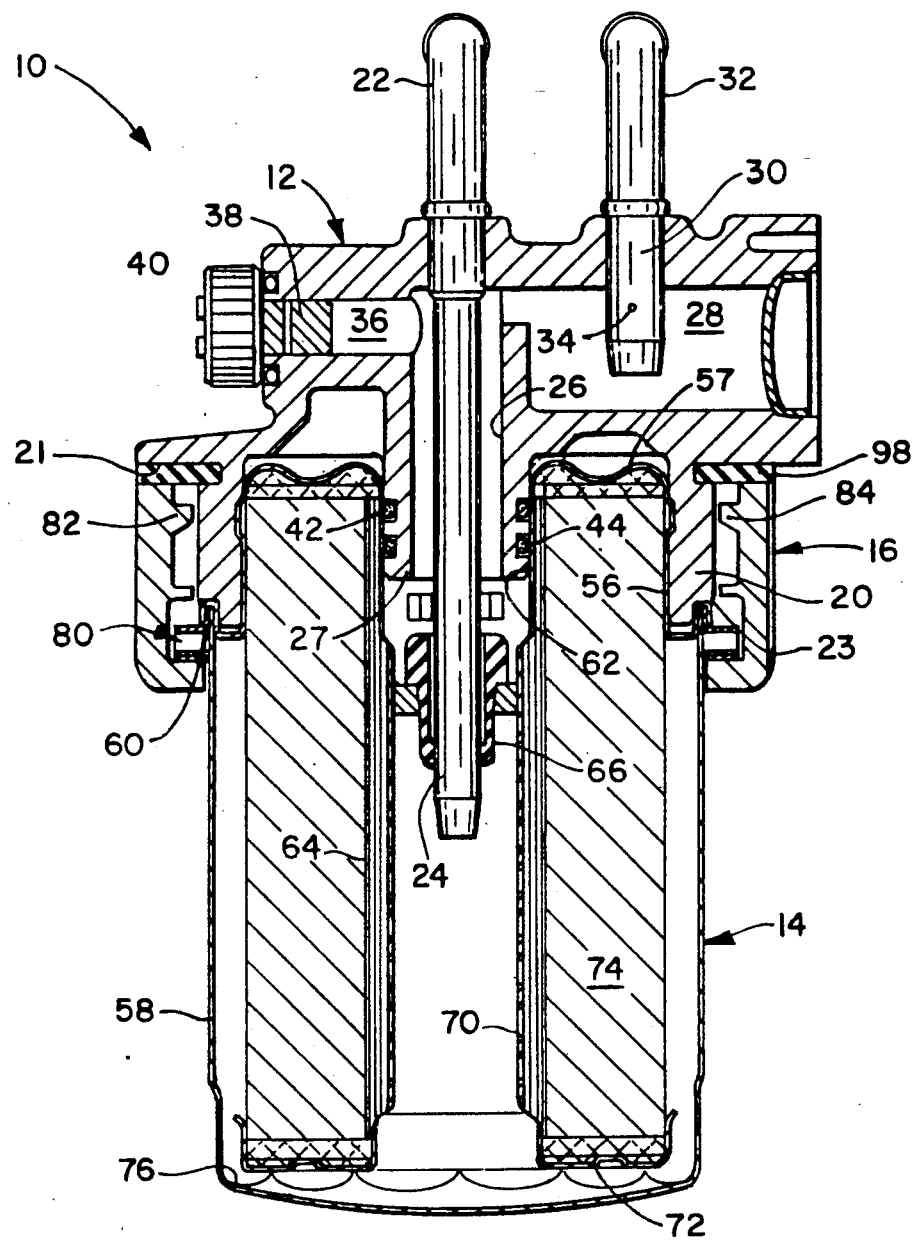
FIG. 1 is an elevated sectional view of a fuel filter assembly in accordance with the present invention.

With reference to the drawings wherein like numerals represent like parts throughout the several figures, a fuel filter assembly in accordance with the present invention is generally designated by the numeral 10. Fuel filter assembly 10 comprises a base 12 and a disposable cartridge 14. The fuel filter assembly lo is especially adapted for incorporation into the fuel supply system of an internal combustion engine (not illustrated), such as a diesel engine, for removing particulate matter from the fuel and for separating water from the fuel. The base is disposed generally above the suspended disposable filter cartridge which is locked to the base by means of a retainer collar 16.

The base 12 and the disposable cartridge 14 may assume a wide variety of configurations. For the disclosed embodiment, the base 12 is a cast component forming an inverted cup-like receptacle which includes a generally cylindrical skirt 20 defining a lower receiving cavity for upper portions of the disposable cartridge. An annular transverse seal surface 21 extends outwardly adjacent to the upper end of the skirt 20. An outer circumferential rim 23 is located at a lower end location of the skirt.

Figure 4:
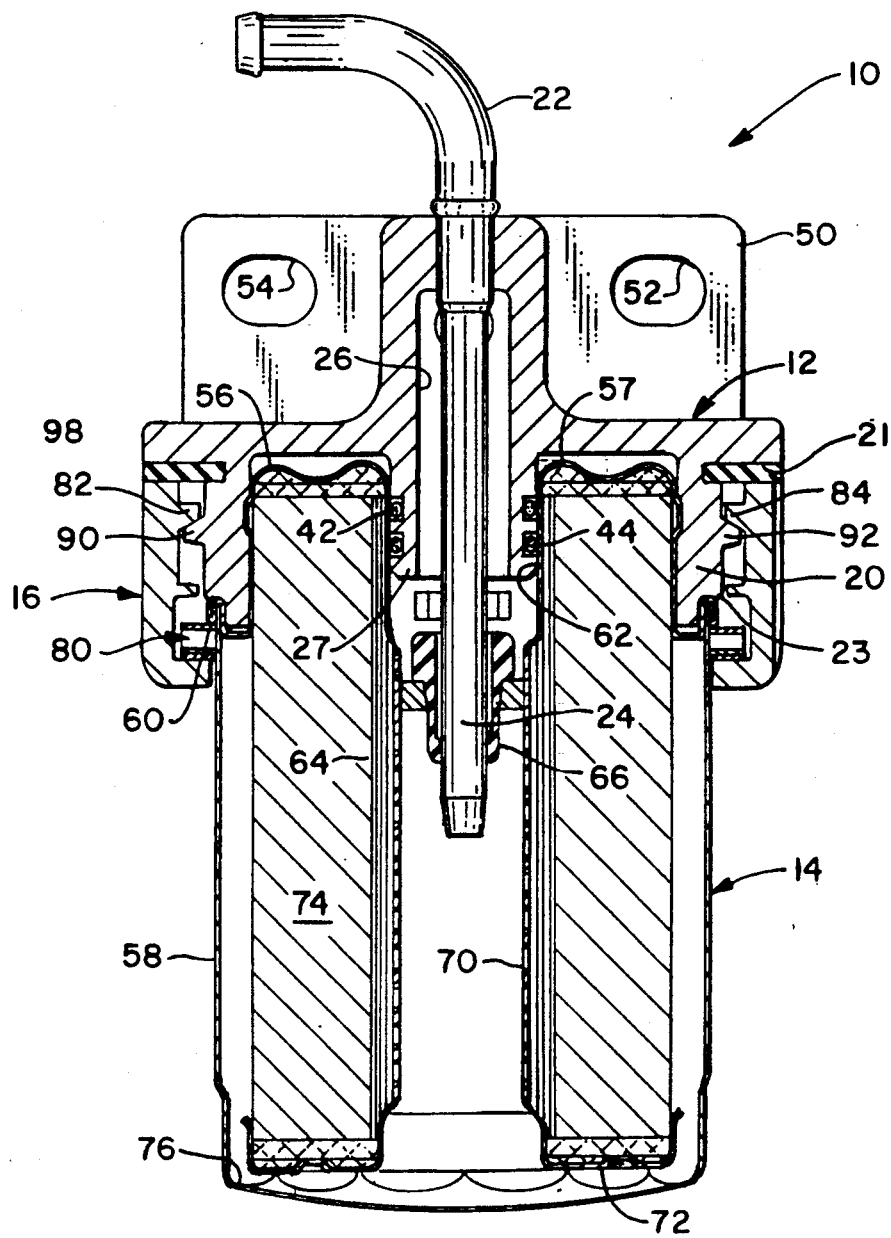
FIG. 4 is an elevated sectional view of the fuel filter assembly of FIG. 1 viewed from the left thereof.
Figure 5:
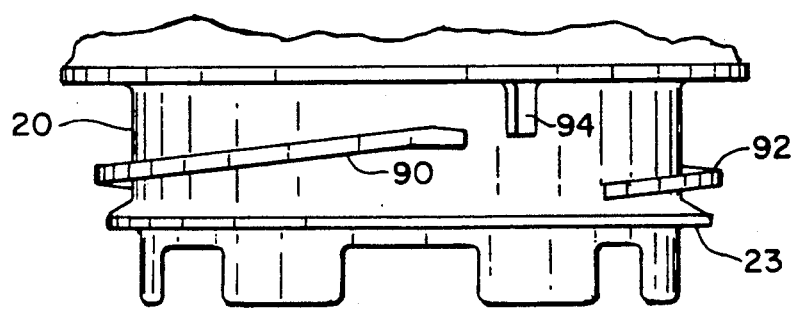
FIG. 5 is a fragmentary frontal perspective view of the base of the fuel filter assembly of FIG. 1.

With reference to FIGS. 1 and 4, an inlet fitting 22 communicates with a central axial conduit 24 which is coaxially disposed in a central axial passageway 26 formed by a central integral tubular post 27 of the base. The inlet fitting 22 and conduit 24 may be an integral component. The passageway 26 defines an axial return passage which connects via a transverse passage 28 with an outlet conduit 30 extending from an outlet fitting 32. A bleed orifice 34 (FIG. 1) is located in the side of conduit 30 and communicates with the transverse outlet passage 28 for preventing the formation of large air bubbles in the filtered fuel stream flowing from the filter. Another transverse passageway 36 also extends through the side of the base from the central return passage 26. Passageway 36 is exteriorly closed by a bleed valve 38 which may be manually opened by rotating knob 40 for bleeding the filter.

The central axial post 27 functions as a mounting post as well as a return conduit for the cartridge. The exterior tubular walls contain a pair of axially spaced annular recesses. Seal rings 42, 44 are mounted in the recesses for fluidically sealing the disposable cartridge upon mounting the cartridge to the base.

With reference to FIG. 4, an integral projecting bracket 50, which may include a pair of slots 52, 54 for receiving fasteners to anchor the filter base to the engine header, projects transversely from the base. Alternately, the base may not have a bracket structure but merely have a pair of fastener openings.

The disposable filter cartridge 14 is dimensioned for close reception by the skirt and the post. The cartridge housing is constructed from a pair of cooperating upper and lower cup-like shell sections 56, 58. Sections 56 and 58 are joined along a circumferential roll seam which forms a shoulder 60. The upper shell section 56 is smaller in diametral and axial dimensions than the lower shell section 58. The upper end 57 of section 56 is configured in sinusoidal contours to provide structural rigidity to resist bulging deformation of the upper end under high fluid pressures within the cartridge. The upper section 56 is also contoured to form a central axial opening for a substantially cylindrical inner surface 62 of a tube 64 which axially defines a central channel. The cylindrical surface 62 is dimensioned to be closely received on the base mounting post and to fluidically seal against the seal rings 42, 44. The lower interior portion of the tube 64 is perforated and folded to form a nipple-like terminus which mounts a sealing grommet 66. The sealing grommet 66 fluidically seals against the received central inlet conduit 24.

A second perforated tube 70, having a flared multi-folded lower end slips over the lower end of tube 64 and extends axially downwardly from the upper tube 64. A circular U-shaped retaining clip 72 integrally outwardly extends from the lower end of tube 70. A filter element 74 having a fan-shaped pleated configuration is mounted at the interior of the cartridge so as to surround tubes 64, 70 and is retained by the cooperating walls of the upper section 56, the tubes 64, 70 and the retaining clip 72.

A sump 76 is formed in the lower section to collect water which coalesces from the fuel. A drain plug (not illustrated) may be mounted in the lower portion of the cartridge for draining the water.

Figure 2:
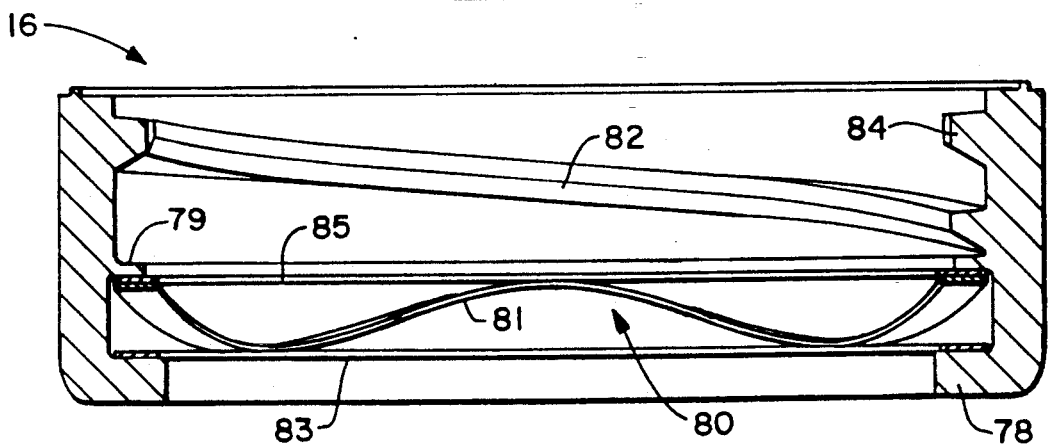
FIG. 2 is an enlarged central sectional view of a retainer employed in the fuel filter assembly of FIG. 1.
Figure 3:
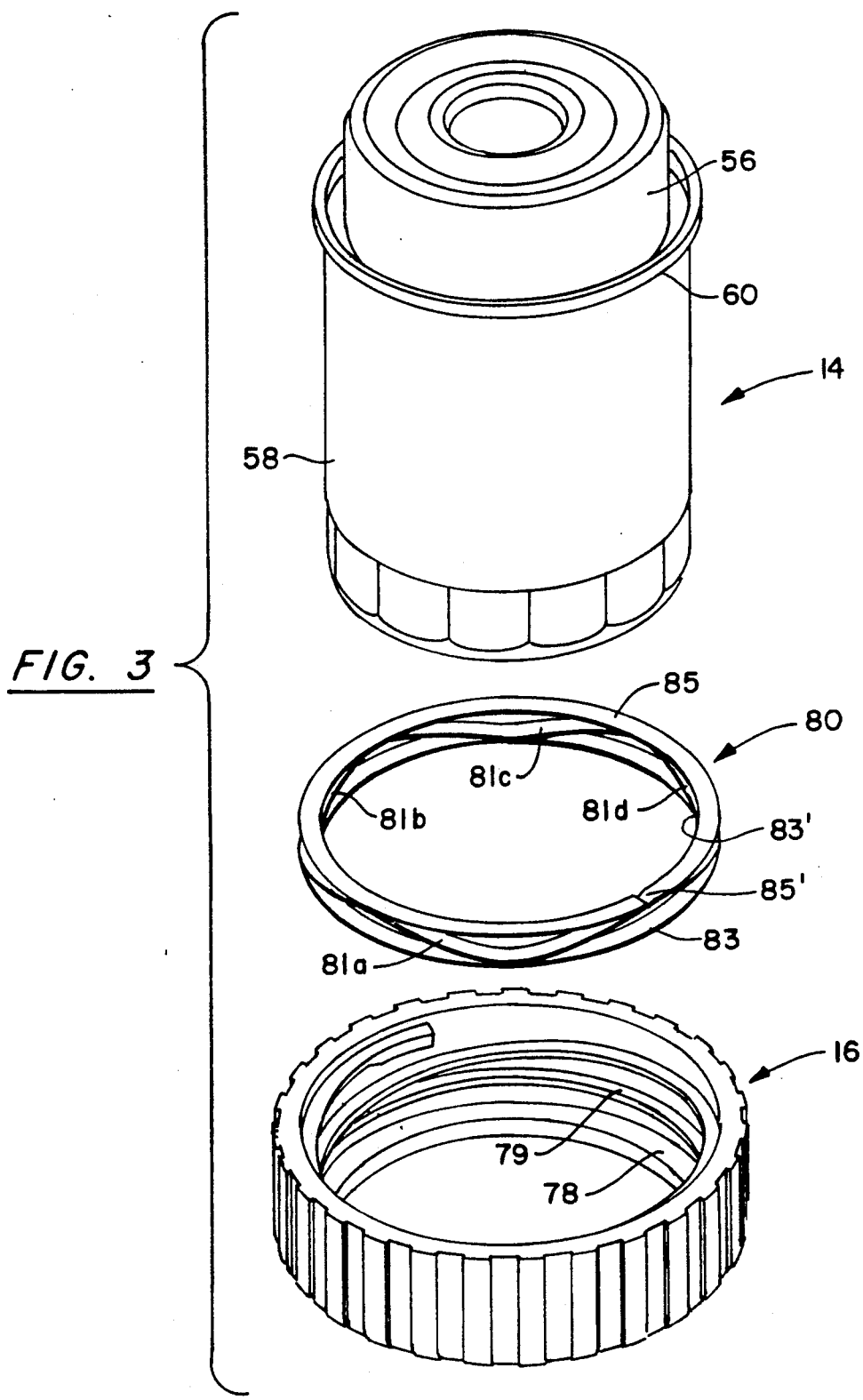
FIG. 3 is an exploded perspective view of a retainer and cartridge employed in the fuel filter assembly of FIG. 1.

With additional reference to FIGS. 2 and 3, the retainer collar 16 includes a pair of axially spaced inwardly protruding shoulders 78, 79 which form an annular recess. A circular wave spring 80 is positioned in the recess and generally retained therein. The split washer-like wave spring 80 has four identical of angularly spaced wave segments 81a, 81b, 81c, 81d. Wave segments 81a and 81d integrally respectively connect with flat engagement washers 83, 85 at end locations 83' and 85'. The wave spring 80 and washers 83, 85 in one embodiment each subtend an angle of approximately 360° with the wave spring segments being disposed between the washers which are generally uniformly axially spaced under most uniform loading conditions as well as in the unloaded state. Wave springs such as marketed as Spirawave ™ wave springs by Smalley Steel Ring Company of Wheeling, Ill. may be suitable.

The upper surface of the spring washer 85 engages the roll seam shoulder 60 of the cartridge to exert a spring bias for retentively locking the disposable cartridge to the base. The collar also includes a pair of diametrically opposed spiral followers 82, 84 which integrally extend inwardly above spring 80. The followers terminate in catches 86, 88 (FIGS. 6a, 6b, 6c) which protrude downwardly at the upper terminus underside of the followers 82, 84.

Figure 6C:
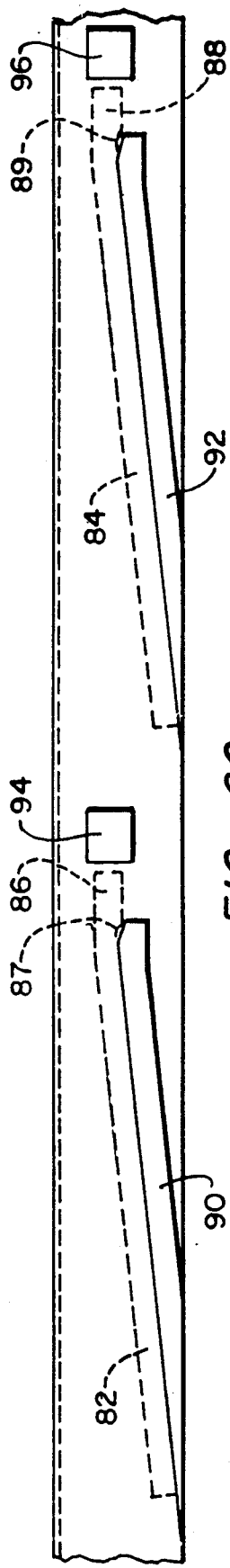
FIGS. 6a, 6b, and 6c are schematic illustrating the retention engagement provided by the retention system for the fuel filter assembly of FIG. 1.
Figure 6B:
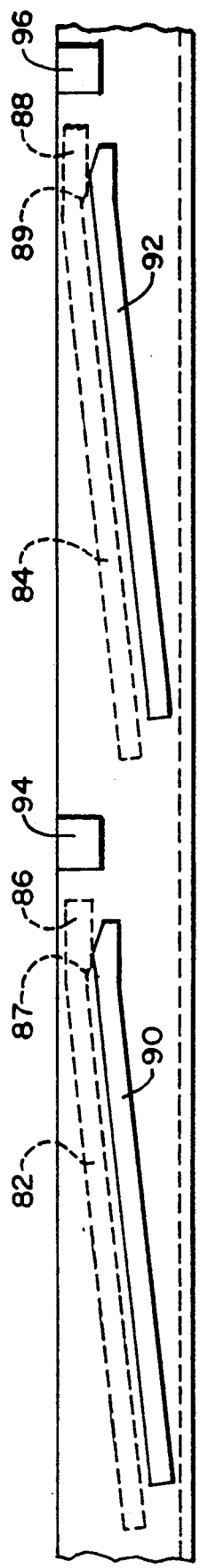
Figure 6A:
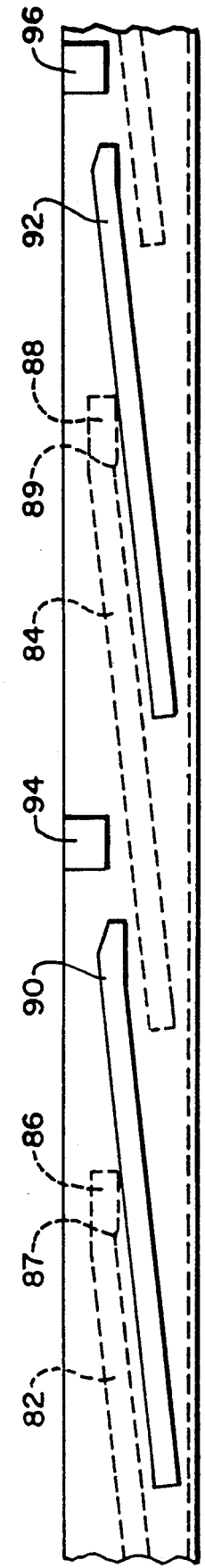

With additional reference to FIGS. 5, 6a, 6b, and 6c, the base includes a pair of integral outwardly projecting diametrically disposed spiral ramps 90 and 92. Each of the ramps ascends in spiral-like fashion in excess of 90 degrees around the base. The upper ends of the ramps are beveled. Stops 94 and 96 are angularly spaced from the respective upper ends of the ramps so that a detentive slot is defined between the upper beveled end of each ramp and the end of the corresponding stop. The followers 82, 84 and catches 86, 88 of the collar are dimensioned and positionable for engagement with the ramps and stops of the base. The collar is positioned around the lower section 56 and upwardly displaced so that washer segment 85 engages shoulder 60. The followers 82, 84 slidably engage and ascend the ramps upon alignment and angular rotation of the collar as illustrated in FIG. 6a. The extreme elevated relationship between the followers and ramps is illustrated in FIG. 6b. As the collar continues to rotate against the axial bias exerted by the spring 80, both catches 86, 88 eventually positively seat in the detentive slots illustrated in FIG. 6c.

The inclination angle of the upper surfaces of the ramp and the underside surfaces of the followers are constant and substantially equal. The upper end surfaces of the base and the ramps and the underside surfaces of the retainer collar followers engage along an extended surface interface as best illustrated in FIG. 6c. The aligned position of FIG. 6c may be facilitated by the leading end of the catches 86 and 88 engaging the stops 94 and 96, respectively.

The positive lock position is releasably maintained by the force of spring 80 which is mounted in the collar and essentially exerts an angularly distributed axial biasing force between the roll seam and shoulder to bias the disposable cartridge against the base. With reference to FIG. 2, the wave spring 80 preferably has a central wave segment which is integrally disposed between substantially planar upper and lower flat washer segments 85, 83. Other wave spring embodiments are also possible. A seal ring 98 may also be disposed between the upper end of the collar and a surface 21 at the underside of the base. The spring provides a generally uniformly distributed bias around the periphery of the cartridge to releasably positively lock the disposable cartridge to the base.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A filter assembly comprising:
    base means comprising a receptacle and ramp means for defining a ramp at the exterior of said receptacle and detent means for defining a detent;
    disposable cartridge means mountable to said base means, at least a portion of said cartridge means being receivable in said receptacle, said cartridge means housing filter means and comprising a peripheral first engagement shoulder; and
    retainer collar means having a central axis comprising a second shoulder and carrying spring means positionable between said first and second shoulders for biasing said first and second shoulders in spaced relationship, said collar means comprising follower means having a catch at one end thereof, said follower means being engageable with said ramp means so that as said collar means is angularly rotated about said axis, said follower means rides said ramp means and said catch engages said detent for capture thereby under the bias of said spring means to lock said cartridge means to said base means.

2. The filter assembly of claim 1 wherein said ramp means comprises a pair of diametrically opposed ramps and said follower means comprises a pair of diametrically opposed followers.

3. The filter assembly of claim 2 wherein said spring means comprises at least one planar washer segment integrally extending from said wave spring.

4. The filter assembly of claim 1 wherein said spring means comprises a spring comprising a wave-shaped portion.

5. The filter of claim 4 wherein said spring is a circular element which comprises four substantially identical wave crests angularly spaced about said axis.

6. The filter assembly of claim 4 wherein said spring is circular and subtends an angle of approximately 360°.

7. The filter assembly of claim 1 wherein said collar means comprises a third shoulder axially spaced from said second shoulder, said spring means being retained between said second and third shoulders.

8. A filter assembly comprising:
    base means having a first axis and comprising receiving means defining a receiving cavity and ramp means for forming a first ramp at the exterior of said receiving means and a stop angularly spaced from said first ramp relative to said first axis and defining a slot therebetween;
    disposable filter cartridge means mountable to said base means, at least a portion of said cartridge means being receivable in said cavity, said cartridge means housing filter means and comprising a peripheral first shoulder;
    spring means comprising a circular wave spring; and
    retainer collar means having a second axis, said spring means being disposed in said retainer collar means, said retainer collar means comprising an interiorly disposed follower terminating in a catch, said catch being slidably engageable against said first ramp as said collar is angularly rotated about said second axis so that said spring means engages said first shoulder and said catch rides said first ramp and said catch positively moves into said slot under the bias force of said spring means to releasably lock said cartridge means to said base means.

9. The filter assembly of claim 8 wherein said wave spring has opposed first and second end locations and further comprising at least one washer segment integrally extending from one end location of said wave spring.

10. The filter assembly of claim 9 wherein a planar washer segment integrally extends from each of said first and second wave spring end locations.

11. The filter assembly of claim 10 wherein each said wave spring and said washer segment subtends angle of approximately 360°.

12. The filter assembly of claim 10 wherein one washer segment engages against said first shoulder.

13. The filter assembly of claim 8 wherein said wave spring comprises four substantially identical wave segments angularly spaced about said second axis.

14. The filter assembly of claim 8 wherein said collar means comprises a pair of axially spaced laterally protruding shoulders and said spring means is positioned between said shoulders.

15. A filter assembly comprising:
    base means defining a receiving structure and ramp means at the exterior of said structure for forming a spiral ramp terminating in a first end;
    disposable cartridge means mountable to said base means for housing a filter element, at least a portion of said cartridge means being receivable in said structure, said cartridge means housing filter means and comprising a peripheral first shoulder;
    spring means comprising a wave spring having a central axis for exerting a biasing force angularly distributed about said central axis; and
    retainer collar means having a second axis and comprising receiving means for receiving said spring means, said spring means being received by said receiving means, said retainer collar means comprising an interior follower terminating in a catch, said catch being slidably engageable against said first ramp as said collar is rotated about said central axis, said wave spring exerting said biasing force against said first shoulder so that said interior follower rides said first ramp and said catch slides by said ramp end to thereby releasably lock said cartridge means to said base means under the force of said biasing force.

16. The filter assembly of claim 15 wherein said wave spring possesses four substantial identical wave segments having crests which are spaced at approximately 90°.

17. The filter assembly of claim 15 further comprising a generally planar washer subtending an angle of approximately 360° and integrally extending from said wave spring and engageable therewith.

18. The filter assembly of claim 17 wherein said washer segment engages said first shoulder.

19. The filter assembly of claim 15 wherein said wave spring has opposed first and second end locations and a planar washer subtending an angle of approximately 360° extends from each of said end locations and wherein said wave spring is positioned between said washer segments.

20. The filter assembly of claim 15 wherein said spring means surrounds said cartridge means when said cartridge means is locked to said base means.

* * * * *